United States Patent [19]

Mueller et al.

[11] Patent Number: 5,560,548
[45] Date of Patent: Oct. 1, 1996

[54] DIVERTER VALVE FOR SHOWER SPRAY SYSTEMS

[75] Inventors: John R. Mueller, Wauwatosa, Wis.; Henry M. Anderson, Jr., Belding, Mich.

[73] Assignee: Idea Factory, Inc., Brookfield, Wis.

[21] Appl. No.: 333,849

[22] Filed: Nov. 3, 1994

[51] Int. Cl.[6] ............................ B05B 1/16; F16K 21/00
[52] U.S. Cl. ........................... 239/442; 239/447; 4/615; 251/149.6
[58] Field of Search ........................... 239/104, 397, 239/444, 442, 443, 446, 447, 579, 583, 289; 137/625.48, 801; 251/142, 149, 149.1, 149.6

[56] References Cited

U.S. PATENT DOCUMENTS

| | | | |
|---|---|---|---|
| 2,588,255 | 3/1952 | Larsh | 239/444 X |
| 3,471,872 | 10/1969 | Symmons. | |
| 3,791,588 | 2/1974 | Buzzi | 239/446 |
| 4,043,337 | 8/1977 | Baugher. | |
| 4,192,463 | 3/1980 | Yxfeldt | 239/397 X |
| 4,203,551 | 5/1980 | Levine | 239/444 X |
| 4,265,229 | 5/1991 | Rice et al. | |
| 4,793,331 | 12/1988 | Stewart. | |
| 4,850,965 | 7/1989 | Zinopoulos et al. | 239/447 X |
| 4,911,704 | 3/1990 | Dixon | 239/447 X |
| 5,429,155 | 7/1995 | Brzyski et al. | 251/149.6 X |

Primary Examiner—Lesley D. Morris
Attorney, Agent, or Firm—Whyte Hirschboeck Dudek S.C.

[57] ABSTRACT

The present invention provides a fluid diverter valve (10) that allows quick connection/disconnection of a hand held sprayer used for cleaning shower stalls and bathrooms. The diverter valve (10) is comprised of a valve housing (20) having a water inlet (21), a first water outlet (22) where a standard shower may be attached, a second water outlet (23) and an annular cavity (24) therebetween; a valve member (40) and an attachment housing (30) for constraining the valve runner (40) within the cavity (24). At the second outlet (23), the attachment housing (30) is fastened to the valve (10) for fluid communication. A spring (50) urges the valve runner (40) into a first position wherein the valve runner (40) seats adjacent the attachment housing, permitting fluid communication only between the inlet (21) and the first outlet (22). The attachment (90) of a flexible conduit (92) of a cleaning attachment system can be coupled to the attachment housing (30), thus urging the valve runner (40) to a second position wherein the valve runner (40) seals the first outlet (22), permitting fluid communication only between the inlet (21) and the second outlet (23).

7 Claims, 5 Drawing Sheets

DIVERTER VALVE FOR SHOWER SPRAY SYSTEMS

BACKGROUND OF THE INVENTION

1. Field of the Invention

This invention relates generally to the field of valves and more particularly to a diverter valve which can be installed between a shower inlet and a shower head to allow quick connection/disconnection of a hand held sprayer used for cleaning shower stalls and bathrooms.

2. Description of the Prior Art

The use of attachments in shower plumbing systems has been well known in the art for some time. Typically these attachments are comprised of a flexible conduit which may be coupled adjacent to a shower head at one end of the conduit to allow fluid communication with a hygiene nozzle secured to the second end of the conduit. These nozzles are intended for daily use and may include hand held spray heads for rinsing off during showering or dental syringes for oral hygiene.

Attachments such as those referred to above often integrate valving systems which include coupling components and diverter valves. Because these attachments are intended to be used daily in conjunction with the act of showering and/or hygiene, they are permanently coupled adjacent the shower head. Additionally, for those devices which are intended to be used simultaneously with the shower head, the diverter valve may permit a partial flow of water to the shower head and a partial flow of water to the attachment.

The patents listed below are representative of the prior art. U.S. Pat. No. 4,043,337, issued to Baugher, teaches a dental syringe attachment which includes a diverter valve attached in-line between a shower head and a water supply pipe. The diverter valve includes a coupling for permanently attaching the dental syringe to the valve. Additionally, the valve includes a rotatably mounted portion which directs water flow to the shower head when rotated to a first position and directs water flow to the syringe when rotated to a second position.

U.S. Pat. No. 4,265,229, issued to Rice et al., also discloses an oral hygiene apparatus for use with showers. Rice teaches a hollow valve body which interconnects the shower inlet pipe with the shower head. A permanently attached hose leading from a needle valve regulated orifice in the valve body connects to a nozzle applicator. The needle valve is manually rotated to control the flow of water into the orifice, through the hose and out the nozzle. In this case, the needle valve functions only to divert a portion of the water flow to the shower head such that water flows from both the shower head and the nozzle.

Another oral hygiene apparatus is taught in U.S. Pat. No. 4,793,331, issued to Stewart. This device includes a permanently attached oral syringe in fluid communication with a shower head by way of a valving assembly. The valving assembly contains a manually adjustable valve stem which controls a diverter valve. The threaded valve stem can be rotated to a first position to allow water flow to both the shower head and the nozzle. Alternatively, in cases of low pressure, the valve stem can be further rotated until water flow to the shower head is completely diverted to the syringe nozzle.

Lastly, U.S. Pat. No. 3,471,872, issued to Symmons, teaches a spray nozzle permanently attached to a bathtub or shower fixture by way of flexible conduit. The fixture contains a diverter valve which diverts water flow to the nozzle in response to a drop in pressure created by opening the nozzle. When the nozzle is closed, a head pressure forces the valve open and allows water flow to the shower head. When the nozzle is opened, a back pressure is created on the valve, forcing it to close and terminating water flow to the shower head. No water will flow out of the shower head so long as the nozzle is passing water. However, when the nozzle is closed, the valve will again be pressured open and water flow to the shower head will resume.

Each of the above mentioned devices is useful to serve the purpose for which it was designed, however, none is well suited for attachments used to clean shower stalls or other bathroom fixtures. For instance, each of the above described devices teaches permanent attachment of a flexible conduit to some type of diverter valve assembly. Permanent attachment is necessary because these devices are intended to be used on a regular basis, i.e., daily. However, such configurations are not conducive to attachments used for cleaning shower stalls or other bathroom fixtures because attachments such as these are required on a less frequent basis, i.e., only during cleaning. When not in use, these cleaning attachments may inhibit use of the shower head. Additionally, some of the above-described devices divert only a portion of the water flow to the attachments, such that water continues to flow out of the shower head also. When cleaning bathroom fixtures, especially shower stalls, it would be undesirable for water to continue to flow out of the shower head because persons who have entered the shower stall to clean the area may become wet.

Furthermore, the limited range of movement of a typical shower head and the limited head pressure in the shower head make it difficult to direct a stream of water to all areas of a shower stall for cleaning purposes. Even when water can be directed to a desired area, the water spray pattern from a shower head makes it difficult to contain the spray to a limited area. For example, when cleaning shower doors or the upper portions of a shower compartment, a typical shower head can not be positioned to direct a rinsing spray to these areas. Thus, these areas may remain unrinsed or water must be transported to these areas using some other means, such as a container.

Therefore, it would be desirable to have a diverter valve assembly and cleaning attachment which would allow the cleaning attachment to be easily removed and stored until needed. Additionally, it would be desirable to provide a diverter valve which shuts off water flow to the shower head when the attachment system is connected. Finally, it would be desirable to provide a rinsing system which allows water to be selectively directed to a an area to be rinsed.

SUMMARY OF THE INVENTION

This invention relates to a cleaning attachment system which can be coupled between a water outlet and a shower head. The system includes a diverter valve, flexible conduit, a coupling at a first end of the conduit for attaching the conduit in fluid communication with the diverter valve and a nozzle attached to a second end of the flexible conduit. In a first embodiment, the diverter valve is comprised of a valve housing having a water inlet, a first outlet and a second outlet; an attachment housing for coupling with the flexible conduit; and a valve runner. The valve runner rides in an annular cavity located within the valve housing. The annular cavity allows fluid communication between the water inlet, the first outlet and the second outlet. A standard shower head may be attached to the first outlet. At the second outlet, the attachment housing is fastened to the valve housing to secure the valve runner in the annular cavity while allowing fluid communication between the attachment housing and the annular cavity. A spring urges the valve runner into a first position wherein the valve runner seats adjacent the attachment housing. In this first position, the valve runner seals the second outlet, permitting fluid communication only between the inlet valve and the first outlet such that water flow is directed through the shower head. When the flexible conduit is coupled with the attachment housing, the coupling urges the valve runner to a second position in the annular cavity. In this second position, the valve runner seals the first outlet, permitting fluid communication only between the inlet valve and the second outlet. In this second position, fluid flow is diverted from the shower head to the attachment until the flexible conduit is uncoupled.

In another embodiment, the flexible conduit is coupled directly to a shower head which is comprised of an outer casing attached to an inner casing to define a flow chamber therebetween. This flow chamber functions to direct water flow out of the shower head by way of shower outlet holes. The inner casing also defines an inner cavity in which a valve runner is slidably mounted. Perforations in the proximal end of the inner cavity allow fluid communication between the cavity and the flow chamber. An attachment housing is engaged with the inner casing to constrain the valve runner to axial movement within the inner cavity. The attachment housing is the same as described above for the first embodiment so that the attachment housing can be used in either embodiment, resulting in a cost savings. A spring urges the valve runner into a first position in the inner cavity wherein the valve runner seats against flanges on the attachment housing. In this first position, the valve runner seals the attachment housing, permitting fluid flow only into the proximal end of the inner cavity such that water flow is directed through the shower outlet holes. However, when the flexible conduit is coupled with the attachment housing, the coupling urges the valve runner to a second position in the inner cavity. In this second position, the valve runner seats within the inner casing and seals the proximal end of the inner cavity such that fluid flows only through the attachment housing. Because the attachment housing is in fluid communication with the flexible conduit, water flow is directed through the flexible conduit to the attachment. Fluid flow will continue to be diverted in this manner from the shower head to the attachment until the flexible conduit is uncoupled.

BRIEF DESCRIPTION OF THE DRAWINGS

In the drawings which illustrate that which is presently regarded as the best modes for carrying out the invention.

DESCRIPTION OF THE PREFERRED EMBODIMENTS

In the detailed description of this invention, like numerals are employed to designate like parts throughout the same. Various items of equipment, such as fasteners, fittings, etc., are omitted so as to simplify the description. However, those skilled in the art will realize that such conventional equipment can be employed as desired.

Figure 1:
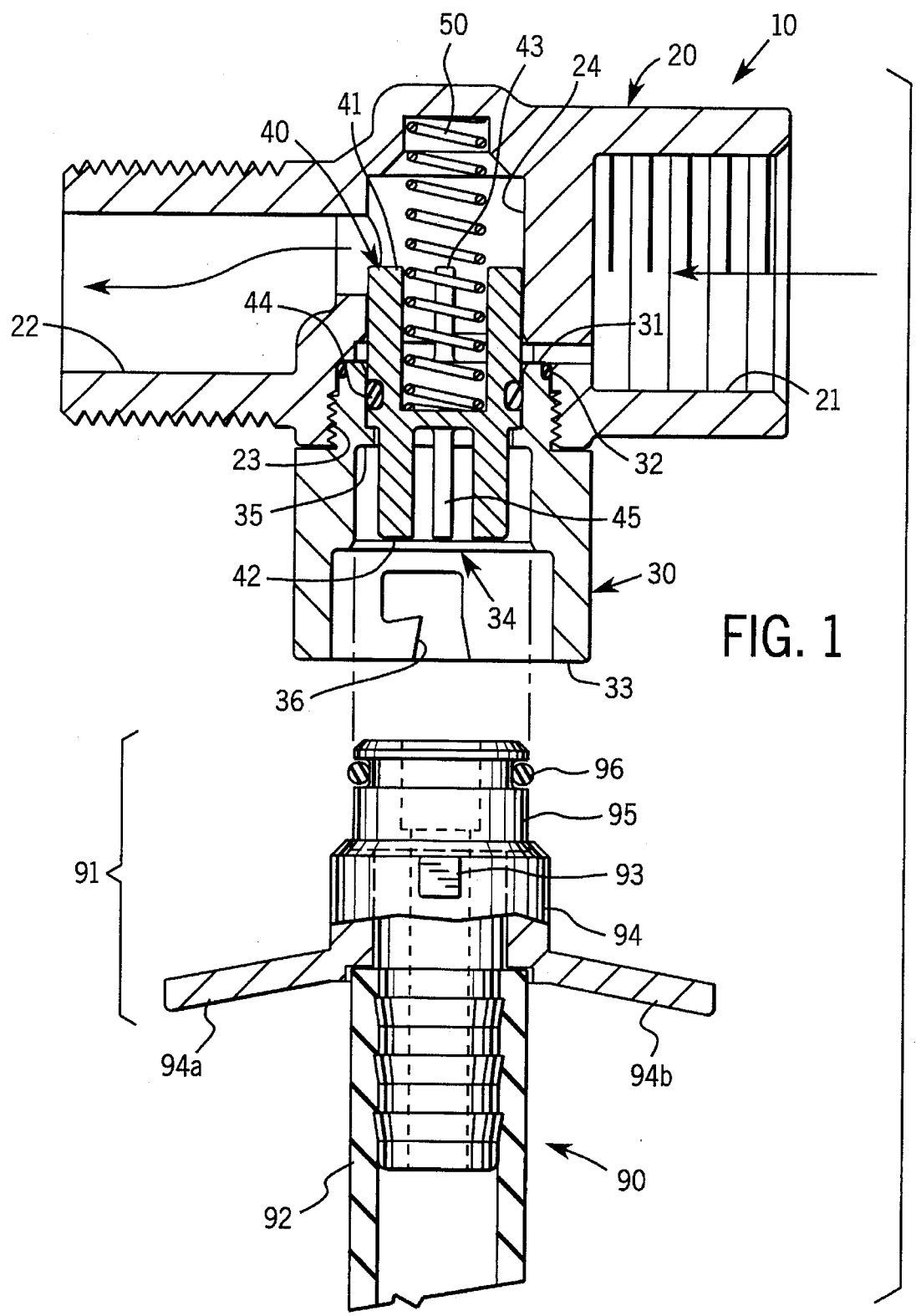
FIG. 1 shows a cross sectional assembly side view of a first embodiment of the diverter valve and hose assembly (not connected).
Figure 2:
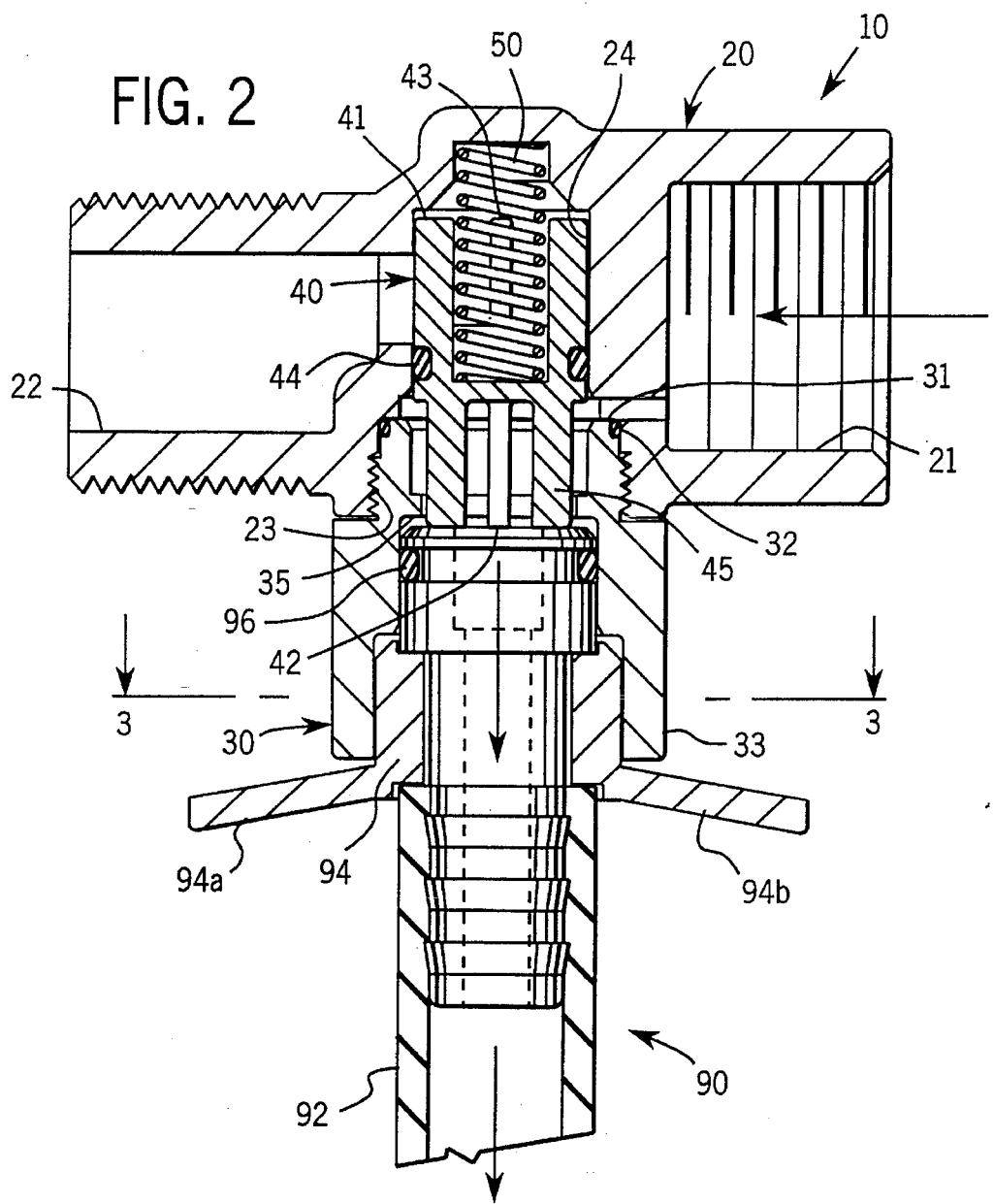
FIG. 2 shows a cross sectional assembly side view of a first embodiment of the diverter valve and hose assembly in which a hose assembly is connected.

In FIGS. 1 and 2 a diverter valve is shown and generally designated as 10. Diverter valve 10 is comprised of a valve housing 20, an attachment housing 30, a valve runner 40 and a spring 50. Valve housing 20 is provided with a water inlet 21, a first water outlet 22, a second water outlet 23 and an annular cavity 24 which allows fluid communication between water inlet 21, first water outlet 22 and second water outlet 23. First water outlet 22 is configured to be attached to a standard shower head (not shown) and water inlet 21 is configured to be attached to a standard water supply pipe (not shown). Second water outlet 23 is configured for receiving attachment housing 30 such that when attachment housing 30 is mated with valve housing 20, o-ring 32 provides sealing contact between adjacent portions of attachment housing 30 and valve housing 20.

Attachment housing 30 is defined by a first end 31, a second end 33, a through bore 34 and an internal shoulder 35. In the preferred embodiment, the inner diameter of first end 31 is equivalent to the diameter of annular cavity 24. Second end 33 is configured to receive attachment 90 which includes a coupling 91 attached to flexible conduit 92. Although coupling 91 may take many forms, the preferred embodiment comprises an adapter 95, a locking ring 94 and an o-ring 96. Locking ring 94 is secured to adapter 95 by flexible conduit 92 such that when coupling 91 seats in sealing contact within second end 33, flexible conduit 92 is in fluid communication with valve housing 20. O-ring 96 enhances sealing contact between coupling 91 and attachment housing 30.

Valve runner 40 is comprised of a first end 41 and a second end 42 and is slidably positioned in annular cavity 24 of valve housing 20. First end 41 is provided with a plurality of guide fingers 43 to guide the movement of valve runner 40 in annular cavity 24 without inhibiting fluid flow therethrough. Second end 42 is also provided with a plurality of fingers 45. The plurality of fingers 43 on first end 41 of valve runner 40 do not inhibit fluid flow between water inlet 21 and water outlet 22. Similarly, the plurality of fingers 45 on second end 42 of valve runner 40 do not inhibit fluid flow between water inlet 21 and flexible conduit 92.

In addition to receiving attachment 90 to permit fluid communication between flexible conduit 92 and valve housing 20, attachment housing 30 is affixed to second water outlet 23 of valve housing 20 so that attachment housing 30 constrains valve runner 40 within annular cavity 24. Spring 50 also rides within annular cavity 24 and urges valve runner 40 against shoulder 35 such that valve runner 40 seats in sealing contact within first end 31 of attachment housing 30. In the preferred embodiment, o-ring 44 is used to enhance sealing contact between valve runner 40 and attachment housing 30 when valve runner 40 is in a first position. When attachment 90 is coupled to second end 33 of attachment housing 30 (as shown in FIG. 2) by way of coupling 91, coupling 91 contacts fingers 45 of valve runner 40 and urges valve runner 40 along annular cavity 24 to a second position. In this second position, valve runner 40 is in sealing contact with valve housing 20, specifically, the wall which defines annular cavity 24. Again, o-ring 44 enhances the sealing contact between the wall of annular cavity 24 and valve runner 40. Because the inner diameters of annular cavity 24 and first end 31 of attachment housing 30 are equivalent, o-ring 44 can provide sealing contact in either the first position or the second position.

Figure 3:
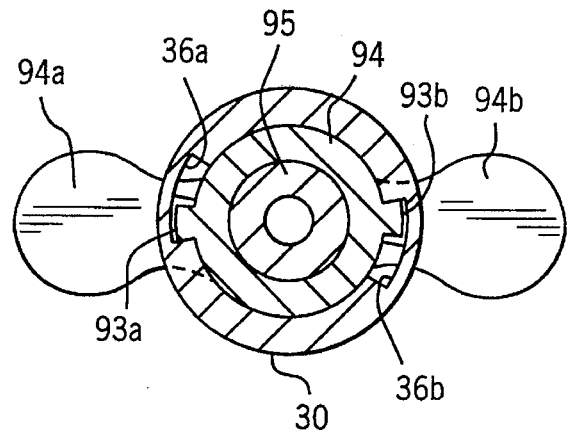
FIG. 3 shows a cut-away cross-sectional axial view of the coupling element of the preferred embodiment.

Although coupling 91 may take many forms, in one embodiment, second end 33 of attachment housing 30 is provided with diametrically opposed hook shaped recesses 36a, 36b for receiving opposing tabs 93a, 93b disposed on the exterior surface of locking ring 94 (see FIG. 3). The angle of each recess 36 is preferably ten degrees to insure that coupling 91 does not inadvertently detach from diverter valve 10 if flexible conduit 92 is twisted. The contact surface of each tab 93 is similarly angled to enhance joiner with each recess 36. Additionally, coupling 91 may be provided with at least one flange to aid in connection and disconnection of attachment 90. In a preferred embodiment illustrated in FIG. 3, lock ring 94 is provided with two flanges 94a, 94b which may be comfortably gripped to connect and disconnect attachment 90.

The operation of diverter valve 10 of FIGS. 1 and 2 will now be described. In FIG. 1, valve runner 40 is depicted in the first position, i.e., hose attachment 90 is not connected. In FIG. 2, valve runner 40 is depicted in the second position, i.e., hose attachment 90 is connected. When runner valve 40 is in the first position, water flow entering inlet valve 21 is directed into annular cavity 24. Because spring 50 urges runner valve 40 against shoulder 35 such that there is sealing contact between attachment housing 30 and valve runner 40, fluid flow passes through annular cavity 24 and out first water outlet 22. The plurality of fingers 43 on valve runner 40 do not inhibit fluid flow between water inlet 21 and first water outlet 22, but merely serve to guide valve runner 40 as it slides in annular cavity 24. When attachment 90 is coupled to diverter valve 10, adapter 95 of coupling 91 contacts fingers 45 of valve runner 40 and urges valve runner 40 to move opposite the direction of the force provided by spring 50. More specifically, when tabs 93a, 93b are fully seated in hook shaped recesses 36a, 36b, valve runner 40 is held in the second position described above. In this second position, valve runner 40 is in sealing contact with the wall defining annular cavity 24 such that water entering water inlet 21 is directed through attachment housing 30 and into flexible conduit 92 which is coupled in sealing contact with attachment housing 30 by way of coupling 91. Because the inner diameters of annular cavity 24 and first end 31 of attachment housing 30 are substantially the same, sealing contact can be maintained between either valve runner 40 and attachment housing 30 (when attachment 90 is not coupled to diverter valve 10) or valve runner 40 and the wall of annular cavity 24 (when attachment 90 is coupled to diverter valve 10).

Diverter valve 10 may be fabricated out of any standard material, such as molded plastic or cast metal.

Figure 4:
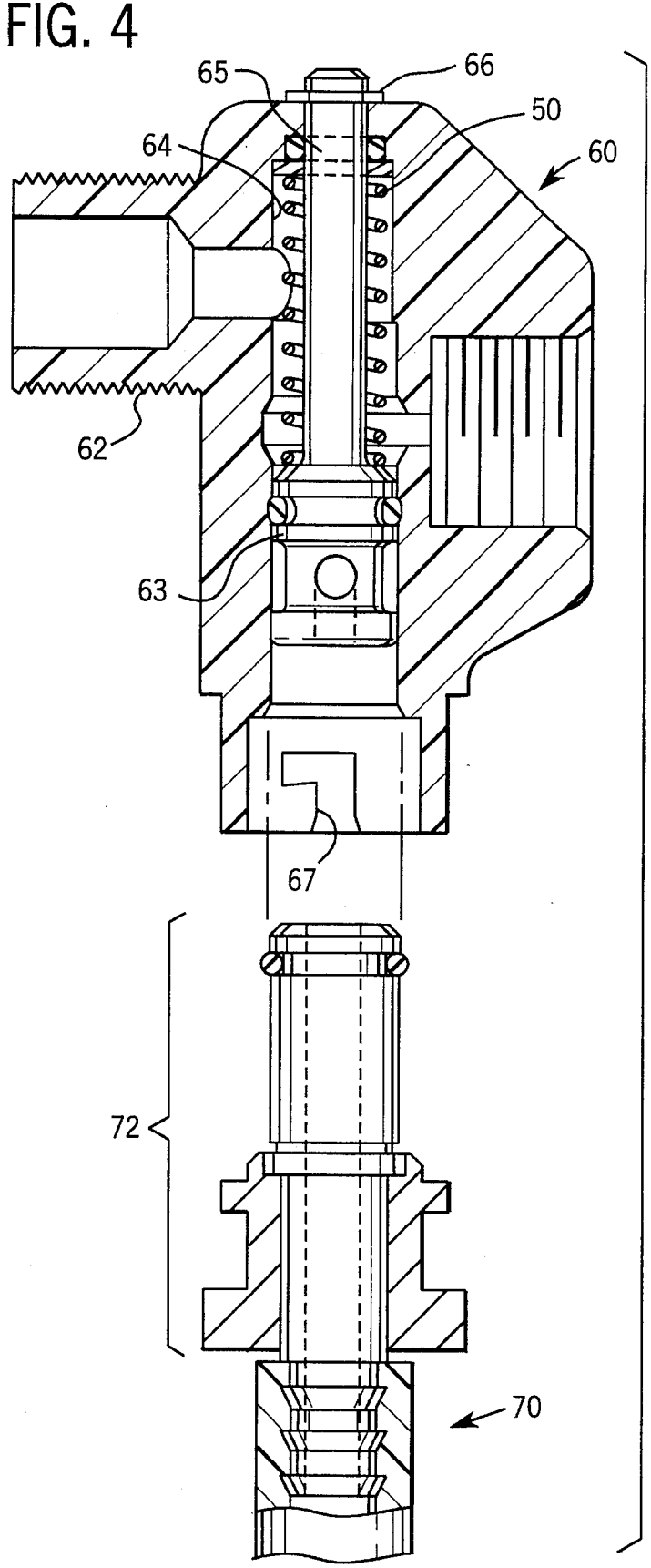
FIG. 4 shows another embodiment of the diverter valve of FIG. 1.

In FIG. 4, another embodiment of the above-described diverter valve is shown. Again, diverter valve 60 is comprised of a valve housing 62, a valve runner 63 and a spring 50. Valve housing 62 is similar in configuration to valve housing 20 of the first embodiment (see FIG. 1) except valve housing 62 is a single piece provided with hook-shaped recesses 67 for receiving coupling 72 of attachment 70.

Additionally, valve runner 63 is constrained and guided within inner cavity 64 by valve stem 65 (which is held in place by fastener 66). Therefore, the attachment housing described in the first embodiment is integrated as part of the single piece valve housing in the second embodiment.

Figure 5:
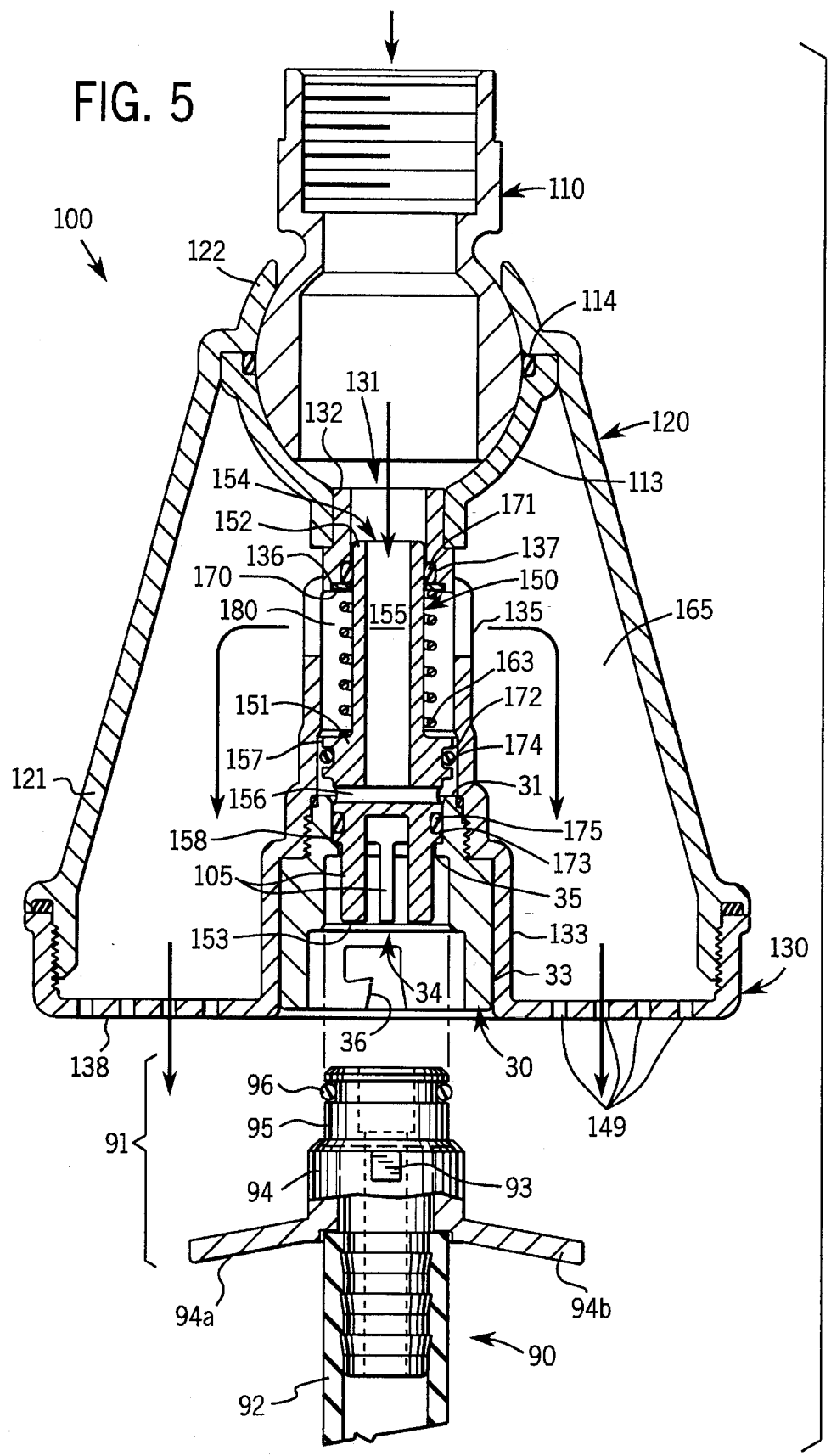
FIG. 5 shows an embodiment of the invention wherein the diverter valve is incorporated in a shower head configured to receive a hose assembly.
Figure 6:
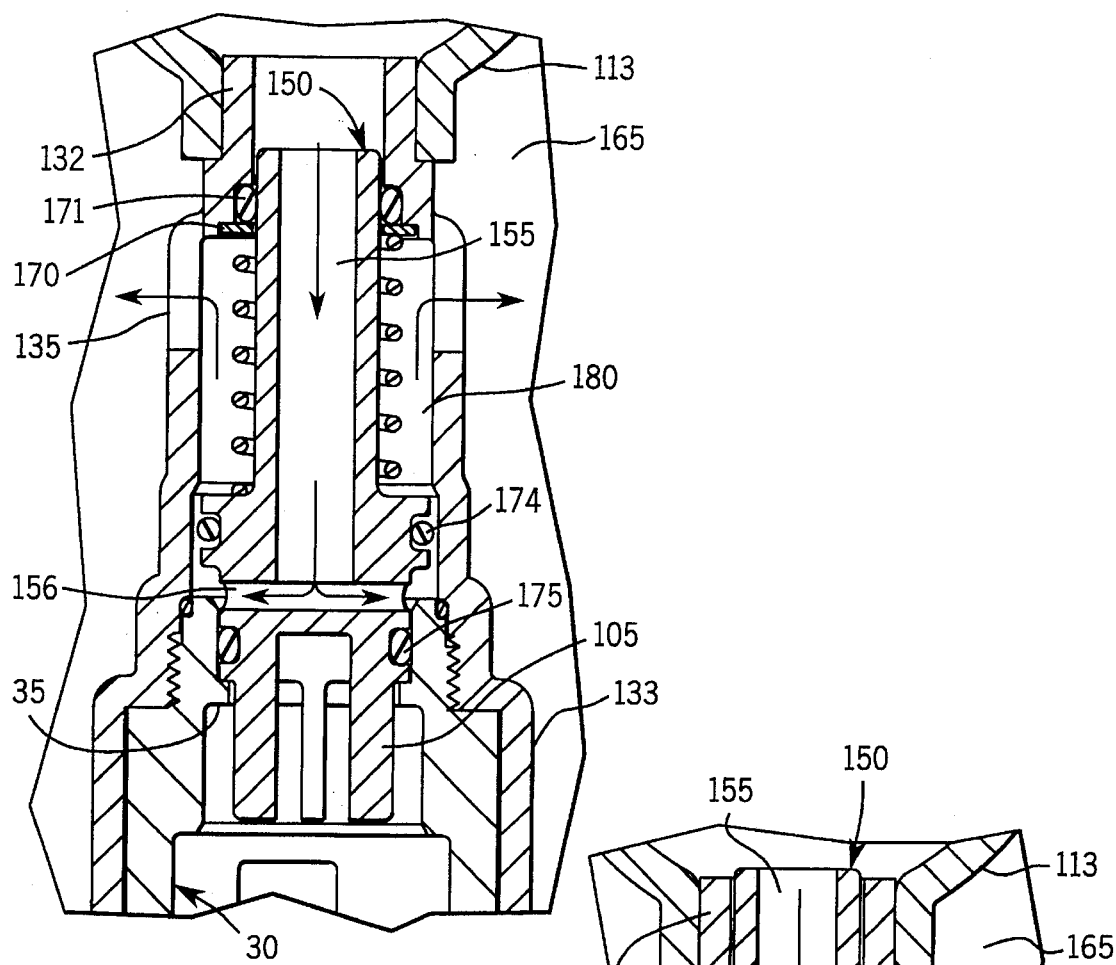
FIG. 6 depicts the fluid flow path through the shower head of FIG. 5 when the hose assembly is not attached.
Figure 7:
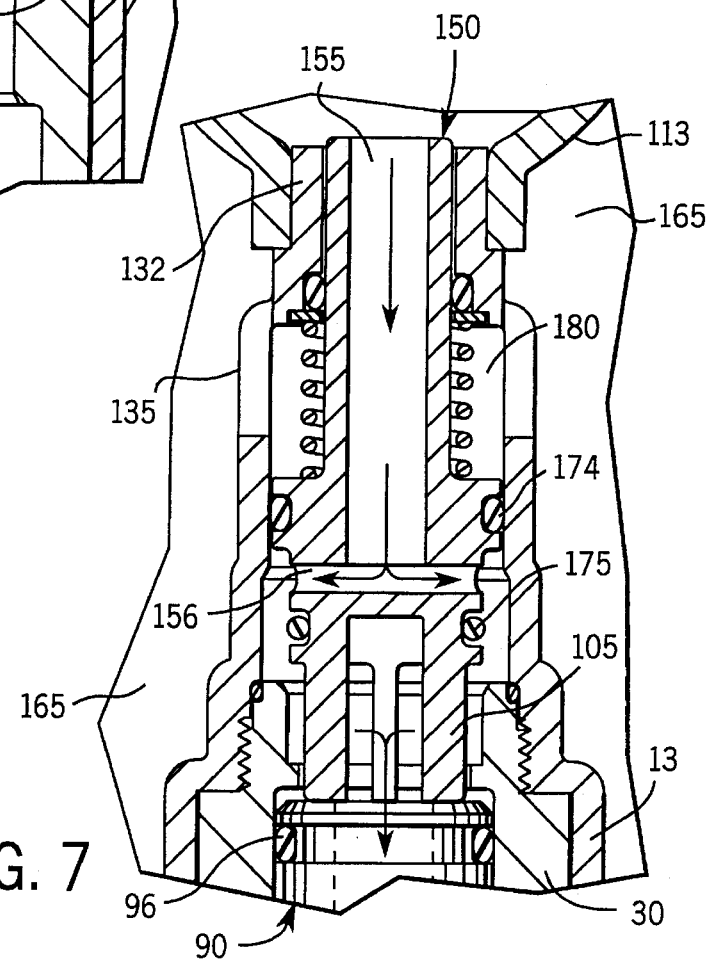
FIG. 7 depicts the fluid flow path through the shower head of FIG. 5 when the hose assembly is attached.

Turning to FIG. 5, still yet another embodiment of the invention is shown. In this embodiment, a shower head 100 is provided with a diverting system similar to that of the first embodiment, however attachment 90 is coupled directly to shower head 100. Specifically, an outer casing 120 is attached to an inner casing 130 to define a flow chamber 165 therebetween. A valve runner 150 is slidingly positioned within a cavity 180 defined by inner casing 130. An attachment housing 30 is mounted to inner casing 130 to constrain the movement of valve runner 150 within cavity 180 between a first position (FIG. 6) and a second position (FIG. 7). In the first position, valve runner 150 diverts water through flow chamber 165. In the second position, valve runner 150 diverts water to attachment 90.

More specifically, inner casing 130 is configured to define an axial bore 131 extending from a first end 132 to a second end 133 such that fluid may flow axially through the interior of inner casing 130. Further defined by the sides of inner casing 130 is an inner cavity 180 which is disposed between first and second ends 132, 133 such that axial bore 131 is in fluid communication with inner cavity 180. The proximal end of cavity 180 is provided with a plurality of apertures 135 to allow fluid communication between the inner cavity 180 and flow chamber 165. Inner casing 130 may also be provided with an interior circumferential groove 136 for receiving washer 170 and an interior circumferential notch 137 for receiving o-ring 171.

Inner casing 130 is also provided with a external circumferential flange 138 which sealingly engages outer casing 120 to further define flow chamber 165. A plurality of apertures 149 are disposed along flange 138 to allow fluid communication between flow chamber 165 and the exterior of shower head 100.

Outer casing 120 has a first end 121 with a first diameter and a second end 122 with a second diameter smaller than the first diameter. A water inlet 110 in fluid communication with axial bore 131 seats in the second end 122 of outer casing 120. In the preferred embodiment, water inlet 110 has a spherical shape at one end to allow ball-and-socket attachment with outer casing 120. A socket casing 113 and o-ring 114 seat within the second end 122 of outer casing 120 to permit ball-and-socket attachment of water inlet 110. This type of ball-and-socket attachment will allow shower head 100 to be universally swiveled relative to a standard water supply pipe (not shown).

Valve runner 150 is comprised of a tubular shaped plug 151 having a first end 152 and a second end 153. Valve runner 150 is provided with an interior passage 154 having a first portion 155 and a second portion 156. First portion 155 is aligned along the axis of plug 151 and extends from first end 152. Second portion 156, which extends radially from first portion 155 and has a slot shape, is in fluid communication with the exterior surface of plug 151. A first flange 157 is disposed circumferentially on the surface of plug 151 above the second portion 156 of interior passage 154 and a second flange 158 is disposed circumferentially on the surface of plug 151 below the second portion 156 of interior passage 154. First flange 157 is provided with a groove 172 for receiving upper o-ring 174. Similarly, second flange 158 is provided with a groove 173 for receiving lower o-ring 175.

First end 152 of valve runner 150 extends into first end 132 of axial bore 131 allowing fluid communication between interior passage 154 and bore 131, while constraining valve runner 150 within cavity 180 to axial movement. O-ring 171 seats in notch 137 to provide sealing contact with first end 152 as it slides within bore 131. Additionally, second end 153 of valve runner 150 is provided with a plurality of axially extending fingers 105.

In the preferred embodiment, attachment housing 30 is the same as is used in conjunction with diverter valve 10 (described above and shown in FIG. 1) and will not be further described. Use of the same attachment housing in several embodiments minimizes manufacturing costs. Attachment housing 30, when incorporated with shower head 100, attaches to inner casing 130 at second end 133 of bore 131 to further define inner cavity 180 and constrain valve runner 150 within cavity 180.

Spring 163 is axially mounted within cavity 180 and urges valve runner 150 against shoulder 35 such that second flange 158 of valve runner 150 seats in sealing contact within first end 31 of attachment housing 30 and sealing contact is provided by lower o-ring 175 of flange 158. In this first position, second portion 156 of interior passageway 154 is in fluid communication with inner cavity 180. When attachment 90 is coupled to second end 33 of attachment housing 30 (see FIG. 7) by way of coupling 91, adapter 95 of coupling 91 contacts fingers 105 of valve runner 150 and urges valve runner 150 axially within cavity 180 to a second position. In this second position, first flange 157 of valve runner 150 is adjacent the wall defining inner cavity 180 such that sealing contact is provided by o-ring 174 between first flange 157 and inner housing 130. In this second position, second flange 158 is not seated with internal flange 35 of attachment housing 30. Therefore, second portion 156 of interior passageway 154 is in fluid communication with flexible conduit 92 of attachment 90 by way of attachment housing 30.

Washer 170 serves to hold o-ring 171 in place as valve runner 150 moves from its second position in cavity 180 to its first position in cavity 180. Additionally, washer 170 serves as a base against which spring 163 can abut.

The operation of shower head 100 of FIG. 5 will now be described. When valve runner 150 is in the first position as shown in FIG. 6, water flow entering water inlet 110 is directed into axial bore 131 which is in fluid communication with interior passage 154. In its first position, i.e., no attachment 90 coupled to shower head 100, valve runner 150 is seated against shoulder 35 and there is sealing contact between lower o-ring 175 and attachment housing 30. Thus, water flowing out of second portion 156 of interior passage 154 travels through apertures 135, located in the proximal end of cavity 180, and into flow chamber 165 wherein water flow is directed out of shower head 100 through apertures 149. When attachment 90 is coupled to shower head 100 as shown in FIG. 7, adapter 95 of coupling 91 contacts fingers 105 of runner valve 150 and urges runner valve 150 to move opposite the direction of the force provided by spring 163. More specifically, when tabs 93a, 93b have fully seated in hook shaped recesses 36a, 36b (described above and shown in FIG. 3), valve runner 150 is held in the second position. In this second position, valve runner 150 seats within cavity 180 of inner casing 130 such that sealing contact is provided between valve runner 150 and internal housing 130 by upper o-ring 174. Thus, water flowing out of interior passage 154 travels around fingers 105, through bore 34 of attachment housing 30, through adapter 95 and into flexible conduit 92.

The individual components of shower head 100 may be fabricated out of any standard material, such as molded plastic or cast metal.

Although the invention has been described in considerable detail through the figures and above discussion, many variations and modifications can be made by one skilled in the art without departing from the spirit and scope of the invention as described in the following claims.

What is claimed is:

1. A shower head for receiving a rinsing system, wherein the rinsing system has a flexible conduit, said shower head comprising:

a. a hollow outer casing having a first end and a second end;

b. a tubular inner casing mounted within said outer casing such that a flow cavity is defined therebetween, said inner casing defined by a first end, a second end and a inner cavity disposed between the first and second ends of the inner casing, said second end having a plurality of apertures which allow fluid communication between said flow cavity and said inner cavity;

c. a valve runner slidingly mounted in the inner cavity of said inner casing, said valve runner defined by a first end, a second end, a first bore extending axially from the first end, a second bore intersecting the first bore and extending radially outward, a first means for sealing the inner cavity located above the second bore, and a second means for sealing the inner cavity located below the second bore;

d. means for constraining said valve runner within said cavity and for receiving said flexible conduit e. fluid inlet means adjacent the first end of said outer casing, said fluid inlet means in fluid communication with the first bore of said valve runner for supplying fluid to the first bore;

f. a spring mounted adjacent the second end of said valve runner;

g. wherein said valve runner is slidable within the inner cavity to a first position in which the first means for sealing seats within the inner cavity such that fluid flow is directed from the fluid inlet means, through the apertures in the second end of said inner casing and into the flow cavity;

h. wherein said valve runner is slidable within the inner cavity to a second position in which the second means for sealing seats within the inner cavity such that fluid flow is directed from the fluid inlet means through said means for constraining.

2. The shower head of claim 1 wherein said means for constraining is an attachment housing engaged with the first end of said inner casing such that said runner is constrained within the inner cavity of said inner casing, said attachment housing having an axial bore therethrough.

3. The shower head of claim 1 wherein said inner casing further comprises a circumferential flange extending outward from the first end of said inner casing, the circumferential flange having apertures therethrough, wherein said flange attaches to the second end of said outer casing.

4. The shower head of claim 1 wherein said attachment housing further comprises means for receiving a rinsing system such that when the rinsing system is received by the attachment housing, said runner valve is urged to the second position.

5. The shower head of claim 1 wherein said valve runner has at least one axially extending finger which guides said valve runner in the annular cavity of said valve housing while allowing fluid to flow from the water inlet through the axial bore of said attachment housing when said valve runner is in the second position.

6. The shower head of claim 1 wherein said first means for sealing is comprised of a outer, circumferential flange having a circumferential slot disposed in the surface of the flange and an o-ring mounted in the slot.

7. The shower head of claim 1 wherein said second means for sealing is comprised of a outer, circumferential flange having a circumferential slot disposed in the surface of the flange and an o-ring mounted in the slot.

* * * * *